(12) United States Patent
Park et al.

(10) Patent No.: US 10,362,358 B2
(45) Date of Patent: Jul. 23, 2019

(54) ELECTRONIC APPARATUS AND SIGNAL TRANSCEIVING METHOD THEREOF

(71) Applicant: SAMSUNG ELECTRONICS CO., LTD., Suwon-si (KR)

(72) Inventors: Jae-won Park, Suwon-si (KR); Bum-youl Bae, Hwaseong-si (KR); Choon-jae Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/689,827

(22) Filed: Aug. 29, 2017

(65) Prior Publication Data

US 2018/0227634 A1    Aug. 9, 2018

(30) Foreign Application Priority Data

Feb. 7, 2017   (KR) ........................ 10-2017-0016992

(51) Int. Cl.
| | | |
|---|---|---|
| H04N 21/462 | (2011.01) | |
| H04N 21/426 | (2011.01) | |
| H04N 21/437 | (2011.01) | |
| H04N 21/472 | (2011.01) | |
| H04N 21/438 | (2011.01) | |
| H04N 21/436 | (2011.01) | |
| H04N 21/442 | (2011.01) | |

(52) U.S. Cl.
CPC ... H04N 21/4622 (2013.01); H04N 21/42607 (2013.01); H04N 21/437 (2013.01); H04N 21/438 (2013.01); H04N 21/43615 (2013.01); H04N 21/44209 (2013.01); H04N 21/472 (2013.01)

(58) Field of Classification Search
CPC ......... H04N 21/4622; H04N 21/42607; H04N 21/437; H04N 21/472; H04N 21/438; H04N 21/43615
See application file for complete search history.

(56) References Cited

U.S. PATENT DOCUMENTS

| | | | | |
|---|---|---|---|---|
| 7,870,593 B2 * | 1/2011 | Stuckman | .............. | H04N 5/782 |
| | | | | 725/114 |
| 2004/0174853 A1 * | 9/2004 | Saito | ..................... | H04W 88/02 |
| | | | | 370/338 |

(Continued)

FOREIGN PATENT DOCUMENTS

| | | |
|---|---|---|
| JP | 3884869 B2 | 2/2007 |
| JP | 2012-256963 A | 12/2012 |

(Continued)

*Primary Examiner* — Oschta I Montoya
(74) *Attorney, Agent, or Firm* — Sughrue Mion, PLLC

(57) ABSTRACT

An electronic apparatus is disclosed. The electronic apparatus includes a communicator configured to receive a first signal from among a plurality of signals and a second from among the plurality of signals from a server through different communication methods and a processor configured to identify a first bandwidth of the first signal from among a plurality of bandwidths and a second bandwidth of the second signal from among the plurality of bandwidths, transmit information regarding a selected bandwidth from among the plurality of bandwidths, and control the communicator to receive one of the plurality of signals corresponding to the selected bandwidth.

15 Claims, 9 Drawing Sheets

(56) References Cited

U.S. PATENT DOCUMENTS

| | | | |
|---|---|---|---|
| 2006/0280168 A1* | 12/2006 | Ozaki | H04L 47/11 370/352 |
| 2009/0135802 A1* | 5/2009 | Haga | H04L 27/2647 370/350 |
| 2009/0135943 A1 | 5/2009 | Nago | |
| 2011/0069747 A1* | 3/2011 | Berlotserkovsky | H04B 1/0003 375/225 |
| 2012/0140799 A1 | 6/2012 | Lim et al. | |
| 2015/0106227 A1* | 4/2015 | Gottlieb | G06Q 30/0633 705/26.8 |
| 2015/0312644 A1* | 10/2015 | Ansley | H04N 21/6125 725/95 |
| 2016/0127973 A1 | 5/2016 | Seo et al. | |
| 2016/0255301 A1 | 9/2016 | Vadura | |

FOREIGN PATENT DOCUMENTS

| | | |
|---|---|---|
| JP | 5111074 B2 | 12/2012 |
| KR | 2002-0059168 A | 7/2002 |
| KR | 10-0648331 B1 | 11/2006 |
| KR | 10-2009-0037724 A | 4/2009 |
| KR | 10-2012-0056644 A | 6/2012 |
| KR | 10-1448839 B1 | 10/2014 |
| KR | 10-2016-0050856 A | 5/2016 |

* cited by examiner

ELECTRONIC APPARATUS AND SIGNAL TRANSCEIVING METHOD THEREOF

CROSS-REFERENCE TO RELATED APPLICATION

This application claims priority from Korean Patent Application No. 10-2017-0016992, filed in the Korean Intellectual Property Office on Feb. 7, 2017, the disclosure of which is incorporated herein by reference in its entirety.

BACKGROUND

1. Field

Apparatuses and methods consistent with exemplary embodiments relate to an electronic apparatus and a signal transceiving method thereof, and more particularly, to an electronic apparatus which transceives a signal with a server and a signal transceiving method thereof.

2. Related Art

As electronics technology has developed, contents can be provided with through various communications methods.

For example, a communication method provided by an external provider may be a Data over Cable Service Interface Specification (DOCSIS) method, a Fiber To The Home (FTTH) method or a Long Term Evolution (LTE) method, and a user can receive a signal transmitted by the external provider through an electronic apparatus such as a set-top box and be provided with various contents.

However, existing electronic apparatuses can process only a determined communication method, and thus, a new electronic apparatus is required to receive a signal transmitted through another communication method.

Also, the existing electronic apparatuses can merely receive and process a signal that a provider transmits passively, and cannot actively select a signal to receive.

SUMMARY

Exemplary embodiments are related to an electronic apparatus which receives a signal having bandwidth selected by a user among a plurality of signals transmitted through different communications methods from a server and a signal transceiving method thereof.

According to an aspect of an exemplary embodiment, there is provided an electronic apparatus, including: a communicator configured to receive a first signal from among a plurality of signals and a second signal from among the plurality of signals from a server through different communication methods; and a processor configured to identify a first bandwidth of the first signal from among a plurality of bandwidths and a second bandwidth of the second signal from among the plurality of bandwidths, transmit information regarding a selected bandwidth from among the plurality of bandwidths, and control the communicator to receive one of the plurality of signals corresponding to the selected bandwidth.

Each of the plurality of signals may have a different bandwidth.

The communicator may be further configured to communicate using a DOCSIS method, a FTTH method and an LTE method.

The server may be configured to transmit only the one signal having the selected bandwidth to the electronic apparatus in response to receiving information regarding bandwidth from the electronic apparatus while the plurality of signals are transmitted to the electronic apparatus.

The processor may be further configured to obtain symbol information regarding each signal by frequency division with respect to each of the plurality of received signals, and identify a corresponding bandwidth of each of the plurality of received signals based on the symbol information.

The electronic apparatus may further include a display configured to display a User Interface (UI) including information regarding the plurality of bandwidths, and the processor may be further configured to transmit information regarding the selected bandwidth to the server based on a user input through the UI.

The electronic apparatus may further include an interface configured to connect to a display apparatus, and the processor may be further configured to generate a UI including information regarding the plurality of bandwidths, transmits the information to an external electronic apparatus, and transmit information regarding the selected bandwidth to the server based on a user input through the UI.

The electronic apparatus may further include an interface configured to connect to a display apparatus, and the processor may be further configured to insert information regarding a corresponding bandwidth of each of the plurality of signals in a header of each of the plurality of signals, transmit the plurality of signals with the information regarding the corresponding bandwidth inserted, and transmit received information regarding bandwidth to the server in response to receiving information regarding the selected bandwidth being received from the display apparatus.

According to an aspect of another exemplary embodiment, there is provided a method through which an electronic apparatus transceives a signal, the method including: receiving a first signal from among a plurality of signals and a second signal from among the plurality of signals from a server through different communication methods; identifying a first bandwidth of the first signal from among a plurality of bandwidths and a second bandwidth of the second signal from among the plurality of bandwidths; transmitting information regarding a selected bandwidth from among the plurality of bandwidths; and receiving one of the plurality of signals corresponding to the selected bandwidth.

Each of the plurality of signals may have a different bandwidth.

The different communication methods may be selected from among a DOCSIS method, a FTTH method and an LTE method.

The method may further include transmitting, by the server, only the one signal having the selected bandwidth to the electronic apparatus in response to receiving information regarding bandwidth from the electronic apparatus while the plurality of signals are transmitted to the electronic apparatus.

The identifying may include obtaining symbol information regarding each signal by frequency division with respect to each of the plurality of received signals, and identifying a corresponding bandwidth of each of the plurality of received signals based on the symbol information.

The method may further include displaying a UI including information regarding the plurality of bandwidths, and the transmitting to the server may include transmitting information regarding the selected bandwidth to the server based on a user input through the UI.

The method may further include connecting to a display apparatus, and the transmitting to the server may include generating a UI including information regarding the plurality of bandwidths, transmitting the information to the display apparatus, and transmitting information regarding the selected bandwidth to the server based on a user input through the UI.

The method may further include connecting to a display apparatus, and the transmitting to the server may include inserting information regarding a corresponding bandwidth of each of the plurality of signals in a header of each of the plurality of signals, transmitting the plurality of signals with the information regarding the bandwidth inserted, and transmitting received information regarding bandwidth to the server in response to receiving information regarding the selected bandwidth being received from the display apparatus.

According to yet another exemplary embodiment, there is provided a non-transitory computer readable recording medium having embodied thereon a program, which when executed by a processor of an apparatus causes the apparatus to execute a method, the method including: receiving a first signal from among a plurality of signals and a second signal from among the plurality of signals from a server through different communication methods; identifying a first bandwidth of the first signal from among a plurality of bandwidths and a second bandwidth of the second signal from among the plurality of bandwidths; transmitting information regarding a selected bandwidth from among the plurality of bandwidths; and receiving one of the plurality of signals corresponding to the selected bandwidth.

The method may further include transmitting, by the server, only the one signal having the selected bandwidth to the electronic apparatus in response to receiving information regarding bandwidth from the electronic apparatus while the plurality of signals are transmitted to the electronic apparatus.

The identifying may include obtaining symbol information regarding each signal by frequency division with respect to each of the plurality of received signals, and identifying a corresponding bandwidth of each of the plurality of received signals based on the symbol information.

The method may further include displaying a UI including information regarding the plurality of bandwidths, and the transmitting to the server may include transmitting information regarding the selected bandwidth to the server based on a user input through the UI.

DETAILED DESCRIPTION

Figure 1:
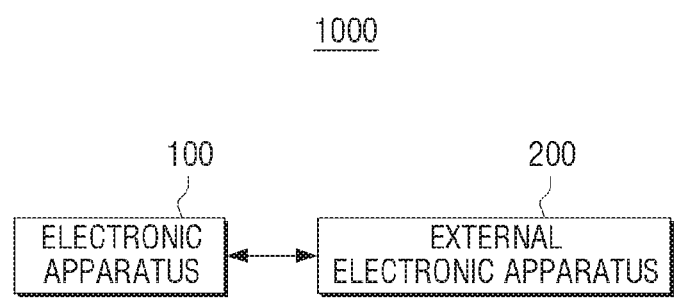
FIG. 1 is a block diagram illustrating a signal transceiving system according to an exemplary embodiment.

Terms used in the present disclosure are selected as general terminologies currently widely used in consideration of the configuration and functions of the present disclosure, but can be different depending on intention of those skilled in the art, a precedent, appearance of new technologies, and the like. In addition, in a special case, terms selected by the applicant may be used. In this case, the meaning of the terms will be explained in detail in the corresponding detailed descriptions. Accordingly, the terms used in the description should not necessarily be construed as simple names of the terms, but be defined based on meanings of the terms and overall contents of the present disclosure.

Further, when a certain portion is stated as "comprising" a certain element, unless otherwise stated, this means that the certain portion may include another element, rather than foreclosing the same. Further, in the present disclosure, a "component," a "module" or a "unit" performs at least one function or operation and may be implemented by hardware or software or a combination of the hardware and the software.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail for conciseness.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail for conciseness.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

Hereinafter, various exemplary embodiments will be described in greater detail with reference to the accompanying drawings.

FIG. 1 is a block diagram illustrating a signal transceiving system according to an exemplary embodiment.

FIG. 1 illustrates that a signal transceiving system 1000 includes an electronic apparatus 100 and an external electronic apparatus 200. Herein, the electronic apparatus 100 and the external electronic apparatus 200 may be connected.

For example, the electronic apparatus 100 and the external electronic apparatus 200 may be connected through the High Definition Multimedia Interface (HDMI) method.

In this case, the electronic apparatus 100 may be embodied as a set-top box, and the external electronic apparatus 200 may be embodied as a TV which can display an image. However, it only pertains to an exemplary embodiment, and the electronic apparatus 100 and the external electronic apparatus 200 may be various electronic apparatuses which can transceive a signal through a bilateral connection. In addition, the connection through the HDMI method is described, but it only pertains to an exemplary embodiment, and the electronic apparatus 100 and the external electronic apparatus 200 may be connected through various methods such as a wireless communication method.

The electronic apparatus 100 and the external electronic apparatus 200 may be connected by configuring the Internet of Things Environment.

Specifically, the electronic apparatus 100 and the external electronic apparatus 200 configuring the Internet of Things Environment may be connected to each other through a server (not illustrated) by using various communication networks. In this case, the electronic apparatus 100 may be implemented as a gateway, and the external electronic apparatus 200 may be implemented as a cell phone, a personal computer, a television, etc. Meanwhile, in the Internet of Things Environment, there is no limit on a type of a thing, and thus, a type of the external electronic apparatus 200 configuring the Internet of Things Environment is not limited thereto either. For example, the external electronic apparatus 200 may be implemented as a refrigerator, a washing machine, etc.

In response to being connected with the external electronic apparatus 200, the electronic apparatus 100 may transmit a signal to the external electronic apparatus 200. For example, if the electronic apparatus 100 is embodied as a set-top box and the external electronic apparatus 200 is embodied as a TV, the electronic apparatus 100 may transmit a broadcast signal to the external electronic apparatus 200.

Herein, the external electronic apparatus 200 may provide services of different quality according to frequency bandwidth of a broadcast signal. For example, if the electronic apparatus 100 transmits a broadcast signal having low frequency bandwidth, i.e., if a broadcast signal having a low data processing capacity per second is transmitted to the external electronic apparatus 200, the external electronic apparatus 200 may provide a low quality image.

If a user desires to receive a high quality image stead of a low quality image, it is necessary to control the electronic apparatus 100 to transmit a signal having high frequency bandwidth by adjusting frequency bandwidth of the signal.

On the contrary, if the user desires to resolve a problem of cost increase by excessive data usage in the state that the high quality image is provided, it is necessary to control the electronic apparatus 100 to transmit a signal having low frequency bandwidth by adjusting the frequency bandwidth of the signal.

Hereinafter, a method by which the electronic apparatus 100 transmits a signal to the external electronic apparatus 200 by adjusting the frequency bandwidth.

Figure 2:
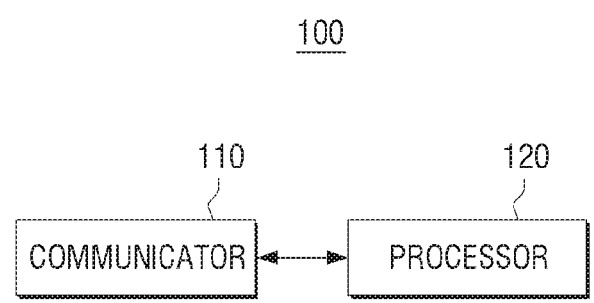
FIG. 2 is a block diagram illustrating a configuration of an electronic apparatus according to an exemplary embodiment.

FIG. 2 is a block diagram illustrating a configuration of an electronic apparatus according to an exemplary embodiment.

FIG. 2 illustrates that the electronic apparatus 100 includes a communicator 110 and a processor 120.

The communicator 110 may communicate with a server (not illustrated) through various communication networks.

A network that the communicator 110 can use to communicate with the server (not illustrated) is not limited to a certain method, and a wired or wireless communication network may be used.

For example, the communicator 110 may communicate with the server (not illustrated) by using a wired communication network such as the DOCSIS method and FTTH method, and may communicate with the server (not illustrated) by using a wireless communication network such as the LTE method.

The processor 120 controls overall operation of the electronic apparatus 100. For example, the processor 120 may control hardware or software elements connected to the processor 210 by driving an operating system or an application program, and perform various data processing and calculations. The processor 120 may load a command or data received from at least one of other elements to a volatile memory to process it, and store various data in a non-volatile memory.

The processor 120 may be implemented as or a generic-purpose processor (e.g., CPU or an application processor) that can perform the corresponding operations through execution of one or more software programs stored in a dedicated processor (e.g., embedded processor) for performing the corresponding operations or a memory device.

The processor 120 may control the communicator 110 to receive a plurality of signals transmitted from the server (not illustrated) through different communication methods.

Herein, the different communication methods may be the DOCSIS method, FTTH method and LTE method. Specifically, the processor 120 may receive a signal transmitted by the DOCSIS method through a copper cable, a signal transmitted by the FTTH method through a fiber cable, and a signal transmitted by the LTE method through a wireless communication module.

For this, the electronic apparatus 100 may further include an interface (not illustrated) which can connect the copper cable, an interface (not illustrated) which can connect the fiber cable and various wireless communication chips.

It is described that the plurality of signals are received by the DOCSIS method, FTTH method and LTE method, but the communication methods are not limited thereto.

The processor 120 may identify each bandwidth of a plurality of signals received from the server (not illustrated).

Specifically, the processor 120 may identify bandwidth of each of the signals by frequency division.

Herein, the frequency division method may be the Orthogonal Frequency Division Multiplexing (OFDM) method. Specifically, the processor 120 may modulate a signal received from the server (not illustrated) to a narrow-band subcarrier that is orthogonal, multiplex the signal, and obtain OFDM symbol information regarding each signal through quadrature amplitude modulation (QAM) de-mapping.

In this case, the processor 120 may identify bandwidth of each signal from the obtained OFDM symbol information.

For example, the processor 120 may determine that the bandwidth of a signal received from the OFDM symbol information is 1 GHz by the DOCSIS method, and the a signal received by the FTTH method may be determined as 5 GHz to 10 Ghz. However, the bandwidth is defined for convenience of the explanation, and bandwidth of the signal transmitted by each communication method is not limited thereto.

It is described that bandwidth of each signal is identified through the OFDM, but the frequency division method is not limited thereto.

The processor 120 may display a UI including information regarding bandwidth of a plurality of signals.

For this, the electronic apparatus 100 may further include a display (not illustrated). In this case, the electronic apparatus 100 may be implemented as a set-top box including the display (not illustrated), and may be an apparatus in which an image providing apparatus such as a TV and a broadcast content receiving apparatus such as a set-top box are integrally implemented. The electronic apparatus 100 may be an apparatus including elements of a set-top box in the image providing apparatus such as a TV, e.g., elements such as the communicator 110 and the processor 120.

Accordingly, the processor 120 may generate a UI displaying bandwidth of each signal and display on a display (not illustrated). In some cases, a UI regarding information of a currently used communication method, e.g., a UI regarding the DOCSIS, FTTH and LTE, may be generated and displayed together with the UI indicating the bandwidth of each signal.

If bandwidth of one of a plurality of signals is selected by a user input through a UI, the processor 120 may transmit information regarding the selected bandwidth to the server (not illustrated).

The user input may be carried out by a user command for selecting a UI displayed on the display (not illustrated). For example, a UI may be selected through a physical key equipped on the electronic apparatus 100 or by controlling the electronic apparatus 100 through a remote controller apparatus such as a remote controller.

Accordingly, in response to any one of bandwidth of a plurality of signals being selected through a UI, the processor 120 may control the communicator 110 to transmit a signal including information regarding the selected bandwidth to the server (not illustrated).

It is described that bandwidth is selected, but a communication method and bandwidth may be selected together by a user input. For example, if bandwidth provided by the DOCSIS communication method overlaps bandwidth provided by the FTTH communication method, a user may respectively select a communication method and bandwidth so that the electronic apparatus 100 may receive a signal of the desired bandwidth through the desired communication method.

In response to receiving the information on the bandwidth from the electronic apparatus 100 in the state of transmitting a plurality of signals to the electronic apparatus 100, the server (not illustrated) may transmit only a signal having selected bandwidth among the plurality of signals to the electronic apparatus 100.

Specifically, in response to receiving the information regarding the bandwidth from the electronic apparatus 100, the server (not illustrated) may modulate a signal to correspond to the signal having the bandwidth selected by the user by QAM mapping and transmit the signal to the electronic apparatus 100. Herein, the signal may be modulated to correspond to the bandwidth selected by the user through symbol rate, sampling rate and subcarrier scaling.

For this, the server (not illustrated) may include a Quadrature Phase Shift Keying (QPSK) demodulator, an OFDM demodulator and a QAM demodulator.

In response to the signal having the bandwidth selected among a plurality of signals being received, the processor 120 may transmit the received signal to the external electronic apparatus 200.

Accordingly, the external electronic apparatus 200 may receive the signal of a size of the bandwidth selected by the user from the electronic apparatus 100, and provide content of quality that the user desires by using the received signal.

Figure 3:
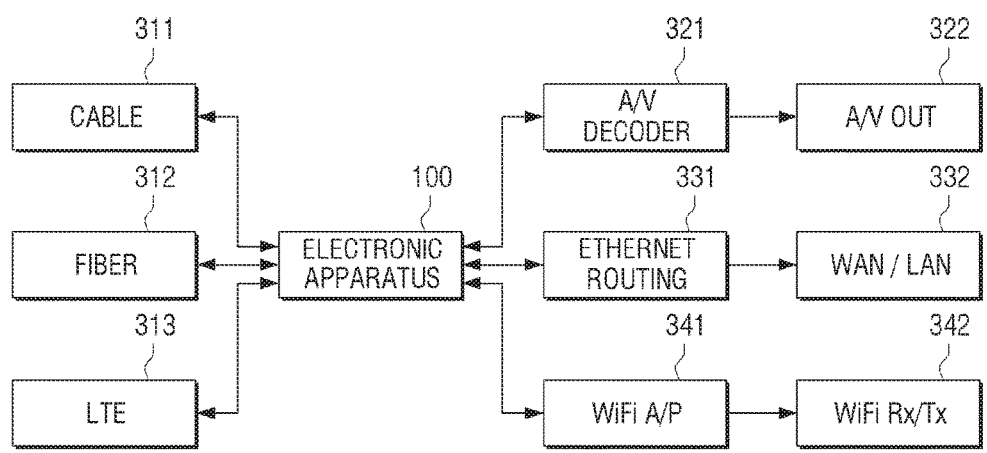
FIG. 3 is a view illustrating a method of receiving a plurality of signals and a method of transmitting a selected signal to an external electronic apparatus according to an exemplary embodiment.

FIG. 3 is a view illustrating a method of receiving a plurality of signals and a method of transmitting a selected signal to an external electronic apparatus according to an exemplary embodiment.

Referring to FIG. 3, the electronic apparatus 100 may receive a plurality of signals through various communication methods through transmission media such as a cable 311, a fiber cable 312 and LTE 313. Herein, the plurality of transmitted signals may respectively have different bandwidth.

The electronic apparatus 100 may identify bandwidth of each of the plurality of signals and display a UI including information thereof, and in response to there being a user input for selecting any one of the displayed UIs, the information regarding the selected bandwidth may be transmitted to the server (not illustrated).

In response to the signal having the selected bandwidth being received from the server (not illustrated), the electronic apparatus 100 may transmit the received signal to the external electronic apparatus 200.

Accordingly, the external electronic apparatus 200 may provide various services by using the signal having the selected bandwidth. For example, a received signal may be decoded by using an A/V decoder 321 and A/V may be output 322, WAN/LAN 332 may be set by using Ethernet routing 331, or communication 342 may be performed with another electronic apparatus by using an Wi-Fi A/P 341.

Such an operation of the external electronic apparatus 200 is only an example, and the external electronic apparatus 200 may perform various operations by using the received signal. For example, if the electronic apparatus 100 is implemented as a gateway, the external electronic apparatus 200 configuring the Internet of Things Environment may turn on/off power, provide an alarming service, etc. by using the signal received from the electronic apparatus 100.

The electronic apparatus 100 transmits a signal having bandwidth selected by a user to the external electronic apparatus 200 and provides A/V quality, Internet speed, etc. that the user desires, thereby, meeting user needs.

Figure 4:
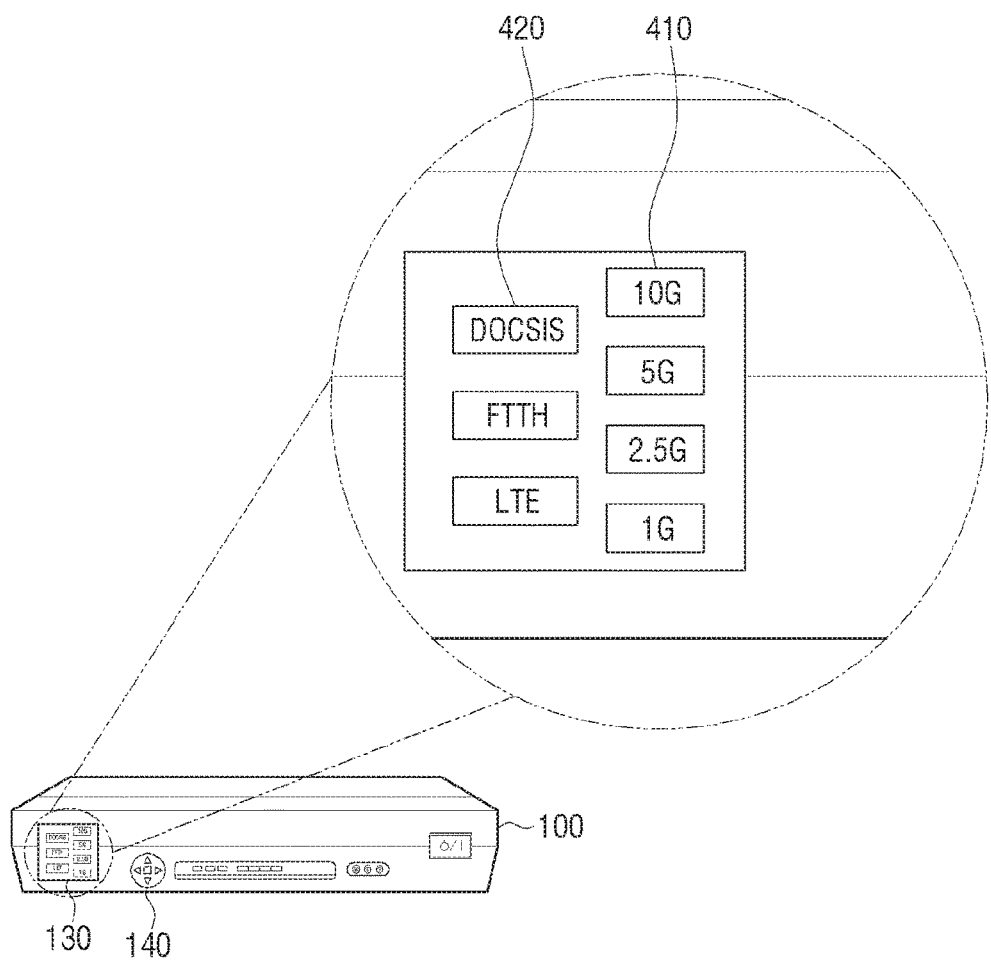
FIGS. 4 and 5 are views illustrating a method of displaying a UI on an electronic apparatus according to an exemplary embodiment.
Figure 5:
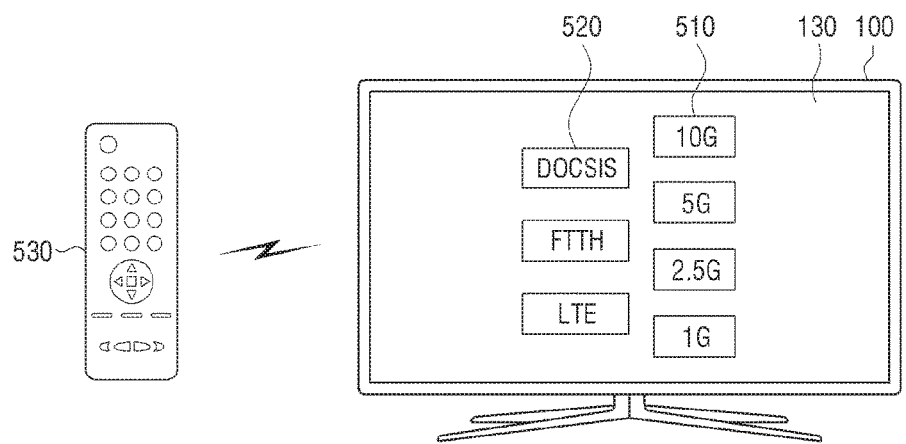

FIGS. 4 and 5 are views illustrating methods of displaying a UI on an electronic apparatus according to an exemplary embodiment. Herein, FIG. 5 illustrates that an image providing apparatus includes configurations of the electronic apparatus 100, such as the communicator 110 and the processor 120. It is not illustrated herein but the electronic apparatus 100 may be an apparatus wherein the image providing apparatus and a set-top box are integrally embodied.

Referring to FIGS. 4 and 5, the electronic apparatus 100 may further include a display 130.

Herein, the display 130 may display various screens. The display 130 may display a UI indicating bandwidth of each signal, or may generate and display a UI with respect to a currently used communication method, e.g., DOCSIS, FTTH or LTE along with the UI indicating the bandwidth of each signal.

The display 130 may be implemented in various forms of displays, e.g., a liquid crystal display (LCD) panel, organic light emitting diodes (OLED), a liquid crystal on silicon (LCoS), a digital light processing, etc. In addition, the display 130 may include a driving circuit which can be implemented in forms of an a-si TFT, a low temperature poly silicon (LTPS) TFT, an organic TFT (OTFT), etc. and a backlight unit.

As illustrated in FIG. 2, in response to a user input for selecting any bandwidth among a plurality of signals being performed through a UI, the processor 120 may control the communicator 110 to transmit a signal including information regarding the selected bandwidth to a server (not illustrated).

The user input may be performed by a user interface 140, e.g., a physical key, equipped with the electronic apparatus 100 as illustrated in FIG. 4, or may be performed by a remote controller apparatus 530, e.g., a remote controller as illustrated in FIG. 5. However, it is not limited thereto, and selecting a UI may be performed by a touch operation on the display 130 screen.

If a user selects any one of bandwidth UIs 410 and 510, the processor 120 may transmit bandwidth information corresponding to the selected UI to a server (not illustrated). For example, if the user selects a 2.5 G UI, the electronic apparatus 100 may transmit a signal including information regarding 2.5 GHz bandwidth to the server (not illustrated).

If the signal including information regarding the 2.5 GHz bandwidth is received from the electronic apparatus 100 while the plurality of signals are transmitted to the electronic apparatus 100, the server (not illustrated) may stop transmitting a signal having different bandwidth and transmit only a signal having the 2.5 GHz bandwidth.

It is described that one of the bandwidth UIs is selected, but communication method UIs 420 and 520 and the bandwidth UIs 410 and 510 may be selected together by a user input. For example, if bandwidth provided by the DOCSIS communication method overlaps bandwidth provided by the FTTH communication method, a user may have the electronic apparatus 100 to receive a signal of desired bandwidth by selecting a communication method and bandwidth, respectively, in a desired communication method.

Herein, it is described that the electronic apparatus 100 includes the display 130, but, in some cases, the electronic apparatus 100 may not include a display.

Figure 6:
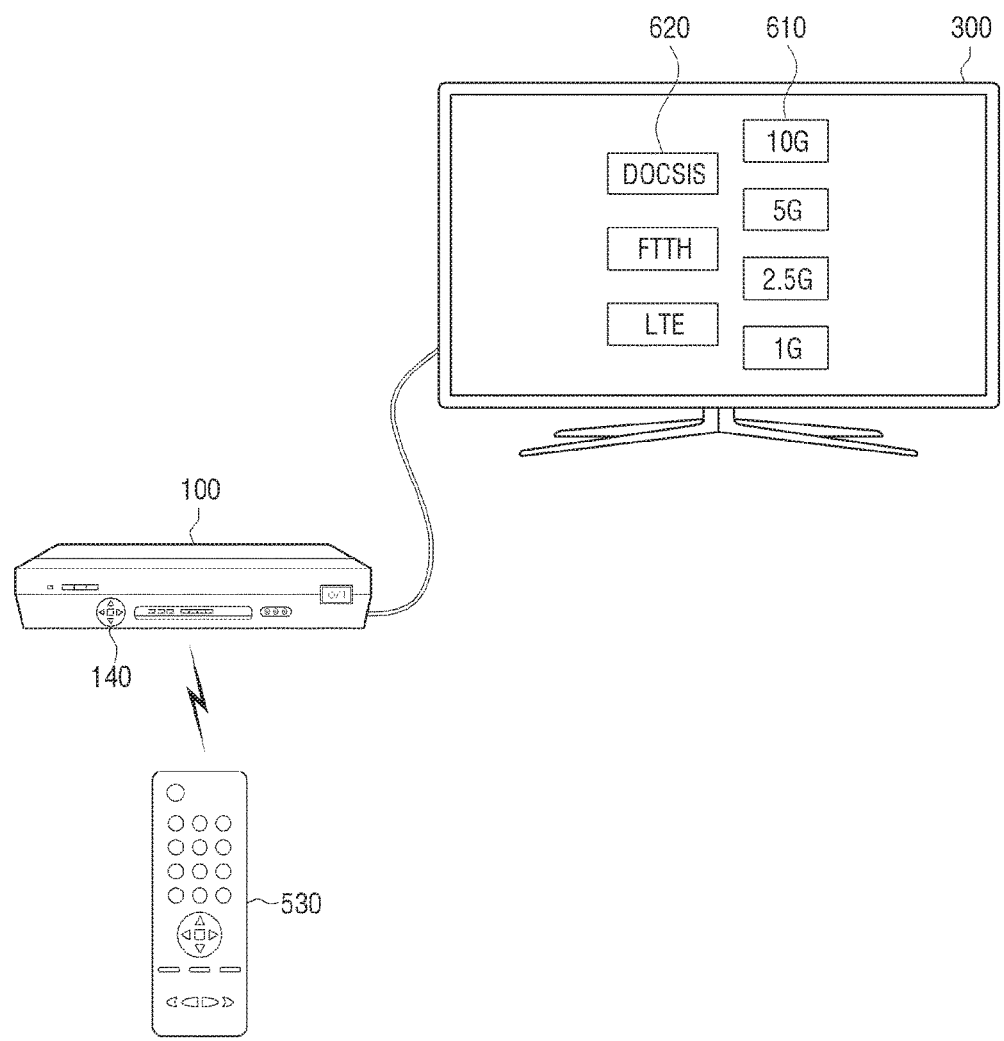
FIG. 6 is a view illustrating a method of an electronic apparatus for displaying a UI and receiving an input of a user command by using a display apparatus according to an exemplary embodiment.

With reference to FIG. 6, a signal transceiving method when the electronic apparatus 100 does not include a display is described.

FIG. 6 is a view illustrating a method of an electronic apparatus for displaying a UI and receiving an input of a user command by using a display apparatus according to an exemplary embodiment.

Herein, the display apparatus 300 may be embodied as a TV which can display a screen. However, it is not limited thereto, and the display apparatus 300 may be various electronic apparatuses which can display a screen such as a monitor.

FIG. 6 illustrates that the electronic apparatus 100 is connected with the display apparatus 300. For this, the electronic apparatus 100 my further include an interface connected with the display apparatus 300.

Herein, the interface may be implemented as various kinds of ports. For example, if the interface is connected with the display apparatus 300 according to the HDMI method, the interface may include an HDMI communication module.

In this case, the processor 120 may generate a UI including information regarding bandwidth of the plurality of signals received from a server and transmit a data comprising information on the UI to the display apparatus 300.

Accordingly, the display apparatus 300 may display a UI 610 indicating bandwidth of each signal received from the electronic apparatus 100, and in response to a user input for selecting any one of bandwidth among the plurality of signals through the UI being performed, the processor 120 may control the communicator 110 to transmit a signal including information regarding selected bandwidth to the server (not illustrated).

Herein, the user input may be performed by manipulating the physical key of the user interface 140 or by controlling the electronic apparatus 100 by the remote controller apparatus 530 such as a remote controller.

It is described that the UI 610 indicating the bandwidth is selected, but the processor 120 may generate the UI 610 indicating bandwidth and a UI 620 indicating a communication method and transmit data comprising information on the UI 610 and the UI 620 to the display apparatus 300. The UI 610 indicating bandwidth and the UI 620 indicating a communication method may be selected together by a user input.

Accordingly, even when the electronic apparatus 100 is not equipped with a display, the electronic apparatus 100 may receive a signal having bandwidth that a user desires from the server by using a display of the display apparatus 300.

It is described that the electronic apparatus 100 generates the UI indicating bandwidth and receives the signal having bandwidth corresponding to a selected UI from the server, but a UI may be generated by a display apparatus connected with the electronic apparatus 100. Hereinafter, it is described with reference to FIG. 7.

Figure 7:
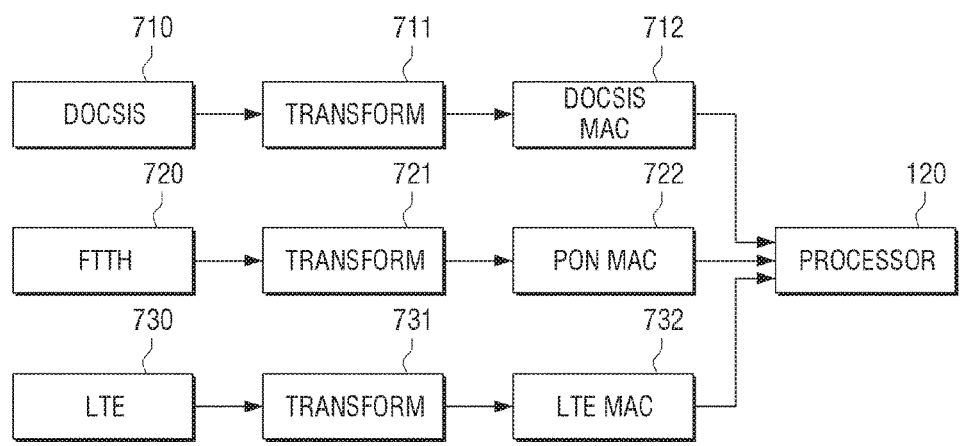
FIG. 7 is a view illustrating a method of inserting bandwidth information in a header according to an exemplary embodiment.

FIG. 7 is a view illustrating a method of inserting bandwidth information in a header and a method of displaying a UI by using the header on a display apparatus according to an exemplary embodiment.

Referring to FIG. 7, the processor 120 may convert a plurality of signals received through DOCSIS 710, FTTH 720 and LTE 730 into electronic signals 711, 721 and 731, respectively.

The processor 120 may insert information regarding respective bandwidth when each electronic signal passes MAC of each communication method in each header. For example, the processor 120 may insert information regarding bandwidth when a signal received in the DOCSIS method passes DOCSIS MAC, and insert information regarding bandwidth when a signal received in the FTTH method passes PON MAC.

The processor 120 may transmit a plurality of signals in which information regarding bandwidth is inserted to a display apparatus (not illustrated). Herein, the display apparatus (not illustrated) may be an apparatus such as a TV including a display. However, it is not limited thereto, and the display apparatus (not illustrated) may be various kinds of electronic apparatuses including a display such as a computer monitor and the like.

The display apparatus (not illustrated) may determine bandwidth of a signal received from the electronic apparatus 100. Specifically, the display apparatus (not illustrated) may determine bandwidth of each signal by using information regarding bandwidth included in a header of each signal.

The display apparatus (not illustrated) may generate a UI indicating bandwidth of each signal and display the UI.

A UI regarding information of a currently used communication method, e.g., DOCSIS, FTTH and LTE, also may be generated and displayed together with the UI indicating bandwidth. In this case, a header of each signal may further include information of a communication method.

Further, if any one of UIs indicating bandwidth of each signal is selected by a user input, the display apparatus (not illustrated) may transmit a signal including information regarding selected bandwidth to the electronic apparatus 100.

Herein, the user input may be performed by a manipulation of a physical key equipped with the display apparatus (not illustrated) or by controlling the display apparatus 300 by a remote controller apparatus such as a remote controller and the like.

The electronic apparatus 100 may transmit a signal including information regarding selected bandwidth received from the display apparatus (not illustrated) to the server (not illustrated), and receive a signal having the bandwidth from the server (not illustrated) later.

Meanwhile, it is described that the bandwidth UI is selected, but a communication method UI and a bandwidth UI may be selected together.

Accordingly, even when a UI generating module is not included or a user input module for selecting a UI is not included, the electronic apparatus 100 may receive a signal having bandwidth that a user desires by using a display apparatus (not illustrated) from the server.

Figure 8:
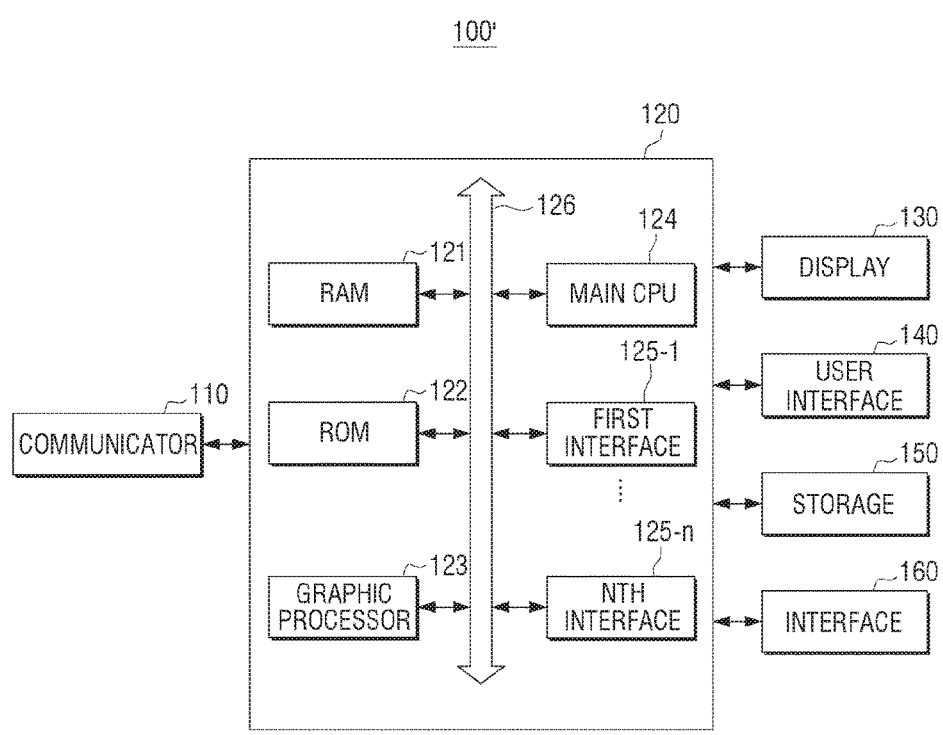
FIG. 8 is a detailed block diagram illustrating an electronic apparatus according to an exemplary embodiment.

FIG. 8 is a detailed block diagram illustrating an electronic apparatus according to an exemplary embodiment.

FIG. 8 illustrates that an electronic apparatus 100' includes the communicator 110, the processor 120, the display 130, the user interface 140, storage 150 and an interface 160.

Hereinafter, description overlapping the above descriptions are omitted.

The storage 150 may store an operating system (OS) to control overall operation of configurations of the electronic apparatus 100' and a command or data related to the configurations of the electronic apparatus 100'.

Accordingly, the processor 120 may control a number of hardware or software elements of the electronic apparatus 100' by using various commands or data stored in the storage 150, process a command or data received from at least one of the configurations by loading them in a volatile memory, and store various data in a non-volatile memory.

The interface 160 may be embodied as various types of ports. For example, if the interface 160 is connected with a display apparatus according to an HDMI method, the interface 160 may include an HDMI communication module.

The processor 120 controls the overall operations of the electronic apparatus 100'.

For example, the processor 120 includes a random access memory (RAM) 121, a read only memory (ROM) 122, a graphic processing unit 123, a central processing unit (CPU) 124, first to n-th interfaces 125-1 to 125-n, and a bus 126. Herein, the RAM 121, the ROM 122, the graphic processing unit 123, the main CPU 124, the first to n-th interfaces 125-1 to 125-n, and the like may be connected to each other through the bus 126.

The first to n-th interfaces 125-1 to 125-n are connected to the variety of components described above. One of the interfaces may also be a network interface connected to an external device through a network.

The main CPU 124 accesses the storage 150 to perform booting by using an O/S stored in the storage 150. In addition, the main CPU 124 may perform various operations using a variety of programs, contents, data, and the like stored in the storage 150.

The RAM 121 stores a set of instructions for booting a system, and the like. When a command to turn on power is input and power is supplied, the main CPU 124 copies an operating system (O/S) stored on the storage 150 according to a command word stored on the ROM 122, and executes the O/S to boot the system. When the booting is completed, the main CPU 124 copies various programs stored in the storage 145 to the RAM 121, and executes the programs copied in the RAM 121 to perform various operations.

Figure 9:
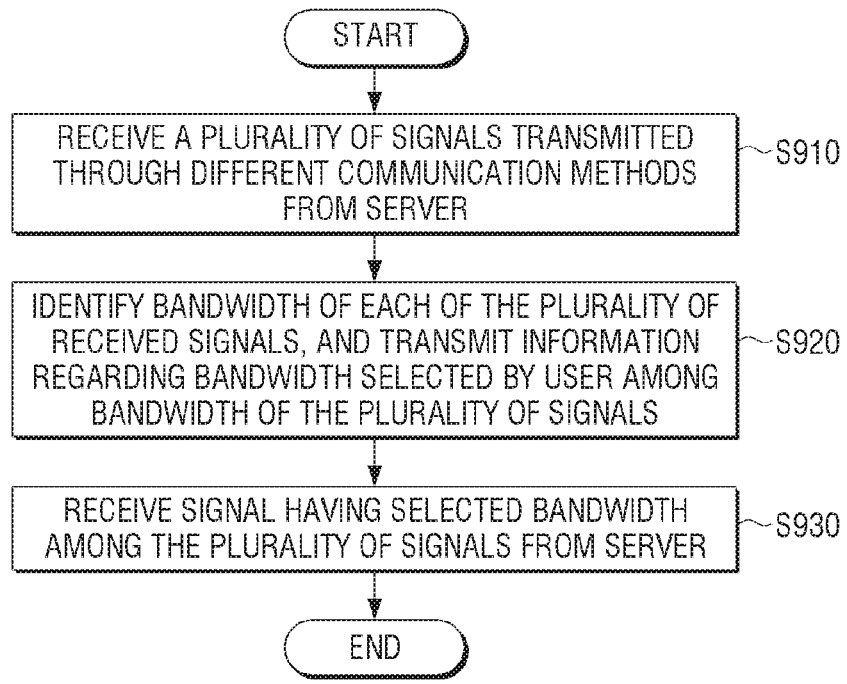
FIG. 9 is a flowchart illustrating a method of transceiving a signal of an electronic apparatus according to an exemplary embodiment.

FIG. 9 is a flowchart illustrating a method of transceiving a signal of an electronic apparatus according to an exemplary embodiment. Herein, overlapping descriptions are omitted.

An electronic apparatus receives a plurality of signals transmitted through different methods from a server (S910). Herein, the different communication methods may be the DOCSIS method, the FTTH method and the LTE method.

The electronic apparatus may identify bandwidth of each of the plurality of received signals and transmit information regarding bandwidth selected by a user among bandwidth of the plurality of signals to the server (S920).

The electronic apparatus may receive a signal having the selected bandwidth selected among the plurality of signals from the server (S930), and provide various contents by using the signal.

A non-transitory computer readable medium, which stores a program for performing the above signal transceiving methods according to various exemplary embodiments in sequence, may be provided.

The non-transitory computer readable medium is a medium that can be read by a computer and that is capable of storing data semi-permanently and not a medium that stores data for a short period of time such as a register, cache and memory and the like. Specifically, each step of the signal transceiving method may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

In the exemplary embodiments, an element, a module, a unit, etc. may be implemented as hardware, firmware or software to perform at least one function or operation or as a combination thereof. For example, they may have at least one microprocessor or an integrated circuit structure such as a memory, processing logic, a lookup table and the like which can perform each function by controlling a different control device. In addition, they may be implemented as a program or a code which includes at least one command which is executable to perform a certain logic function. They may include a processor such as a CPU and a microprocessor to perform each function. Further, except for the case that it is necessary for each of them has to be implemented as certain hardware, they may be integrated as at least one module or chip and be implemented as at least one processor (not illustrated).

Although exemplary embodiments have been illustrated and described hereinabove, the present disclosure is not limited to the above-mentioned specific exemplary embodiments, but may be variously modified by those skilled in the art to which the present disclosure pertains without departing from the scope and spirit of the disclosure as disclosed in the accompanying claims. These modifications should also be understood to fall within the scope of the present disclosure.

What is claimed is:

1. An electronic apparatus, comprising:
   a communicator; and
   a processor configured to:
      receive, from a server, a first signal in a first communication method and a second signal in a second communication method different from the first communication method via the communicator,
obtain symbol information corresponding to each of the first and the second signal by dividing a frequency of each of the first and the second signal,
identify a first bandwidth of the first signal and a second bandwidth of the second signal based on the symbol information,
based on a user input to select one from among the first bandwidth and the second bandwidth being received, control the communicator to transmit information corresponding to the selected bandwidth to the server, and
in response to transmitting the information, receive, from the server, one from among the first signal and the second signal corresponding to the selected bandwidth via the communicator,
wherein the processor is configured to, based on the first bandwidth of the first signal overlapping the second bandwidth of the second signal:
based on a user input to select one from among the first communication method and the second communication method being received, control the communicator to transmit information corresponding to the selected communication method to the server, and
in response to transmitting the information, receive, from the server, one from among the first signal and the second signal corresponding to the selected communication method via the communicator.

2. The electronic apparatus as claimed in claim 1, wherein the communicator is further configured to communicate using a DOCSIS method, a FTTH method and an LTE method.

3. The electronic apparatus as claimed in claim 1, wherein the server is configured to transmit only the one signal having the selected bandwidth to the electronic apparatus in response to receiving information regarding bandwidth from the electronic apparatus while the first signal and the second signal are transmitted to the electronic apparatus.

4. The electronic apparatus as claimed in claim 1, further comprising a display configured to display a User Interface (UI) including information regarding the first bandwidth and the second bandwidth,
wherein the processor is further configured to transmit information regarding the selected bandwidth to the server based on a user input through the UI.

5. The electronic apparatus as claimed in claim 1, further comprising an interface configured to connect to a display apparatus,
wherein the processor is further configured to generate a UI including information regarding the first bandwidth and the second bandwidth, transmits the information to an external electronic apparatus, and transmit information regarding the selected bandwidth to the server based on a user input through the UI.

6. The electronic apparatus as claimed in claim 1, further comprising an interface configured to connect to a display apparatus,
wherein the processor is further configured to insert information regarding a corresponding bandwidth of each of the first signal and the second signal in a header of each of the first signal and the second signal, transmit the first signal and the second signal with the information regarding the corresponding bandwidth inserted, and transmit received information regarding bandwidth to the server in response to receiving information regarding the selected bandwidth being received from the display apparatus.

7. A method through which an electronic apparatus transceives a signal, the method comprising:
receiving, from a server, a first signal in a first communication method and a second signal in a second communication method different from the first communication method;
obtaining symbol information corresponding to each of the first and the second signal by dividing a frequency of each of the first and the second signal;
identifying a first bandwidth of the first signal and a second bandwidth of the second signal based on the symbol information;
based on a user input to select one from among the first bandwidth and the second bandwidth being received, transmitting information corresponding to the selected bandwidth to the server; and
in response to transmitting the information, receiving, from the server, one from among the first signal and the second signal corresponding to the selected bandwidth,
wherein the method further comprising, based on the first bandwidth of the first signal overlapping the second bandwidth of the second signal:
based on a user input to select one from among the first communication method and the second communication method being received, transmitting information corresponding to the selected communication method to the server, and
in response to transmitting the information, receiving, from the server, one from among the first signal and the second signal corresponding to the selected communication method.

8. The method as claimed in claim 7, wherein the different communication methods are selected from among a DOCSIS method, a FTTH method and an LTE method.

9. The method as claimed in claim 7, further comprising transmitting, by the server, only the one signal having the selected bandwidth to the electronic apparatus in response to receiving information regarding bandwidth from the electronic apparatus while the first signal and the second signal are transmitted to the electronic apparatus.

10. The method as claimed in claim 7, further comprising displaying a UI including information regarding the first bandwidth and the second bandwidth,
wherein the transmitting to the server comprises transmitting information regarding the selected bandwidth to the server based on a user input through the UI.

11. The method as claimed in claim 7, further comprising connecting to a display apparatus,
wherein the transmitting to the server comprises generating a UI including information regarding the first bandwidth and the second bandwidth, transmitting the information to the display apparatus, and transmitting information regarding the selected bandwidth to the server based on a user input through the UI.

12. The method as claimed in claim 7, further comprising connecting to a display apparatus,
wherein the transmitting to the server comprises inserting information regarding a corresponding bandwidth of each of the first signal and the second signal in a header of each of the first signal and the second signal, transmitting the first signal and the second signal with the information regarding the bandwidth inserted, and transmitting received information regarding bandwidth to the server in response to receiving information regarding the selected bandwidth being received from the display apparatus.

13. A non-transitory computer readable recording medium having embodied thereon a program, which when executed by a processor of an apparatus causes the apparatus to execute a method, the method including:

Receiving, from a server, a first signal in a first communication method and a second signal in a second communication method different from the first communication method;

obtaining symbol information corresponding to each of the first and the second signal by dividing a frequency of each of the first and the second signal;

identifying a first bandwidth of the first signal and a second bandwidth of the second signal based on the symbol information;

based on a user input to select one from among the first bandwidth and the second bandwidth being received, transmitting information corresponding to the selected bandwidth to the server; and in response to transmitting the information, receiving one from among the first signal and the second signal corresponding to the selected bandwidth, wherein the method further including, based on the first bandwidth of the first signal overlapping the second bandwidth of the second signal:

based on a user input to select one from among the first communication method and the second communication method being received, transmitting information corresponding to the selected communication method to the server, and in response to transmitting the information, receiving, from the server, one from among the first signal and the second signal corresponding to the selected communication method.

14. The non-transitory computer readable recording medium as claimed in claim 13, wherein the method further comprises transmitting, by the server, only the one signal having the selected bandwidth to the apparatus in response to receiving information regarding bandwidth from the apparatus while the first signal and the second signal are transmitted to the apparatus.

15. The non-transitory computer readable recording medium as claimed in claim 13, wherein the method further comprises displaying a UI including information regarding the first bandwidth and the second bandwidth, wherein the transmitting to the server comprises transmitting information regarding the selected bandwidth to the server based on a user input through the UI.

* * * * *